United States Patent
Bhatia et al.

(10) Patent No.: US 9,407,763 B2
(45) Date of Patent: Aug. 2, 2016

(54) SYSTEMS AND METHODS FOR PROVIDING CONTEXT TO A FORWARDED CALL

(71) Applicant: Sabse Technologies, Inc., Mountain View, CA (US)

(72) Inventors: Sabeer Bhatia, Mountain View, CA (US); Ravi Patel, Mountain View, CA (US); Dhruv Patel, Mountain View, CA (US)

(73) Assignee: Sabse Technologies, Inc., Mountain View, CA (US)

( * ) Notice: Subject to any disclaimer, the term of this patent is extended or adjusted under 35 U.S.C. 154(b) by 0 days.

(21) Appl. No.: 14/498,338

(22) Filed: Sep. 26, 2014

(65) Prior Publication Data
US 2016/0094710 A1    Mar. 31, 2016

(51) Int. Cl.
*H04M 1/56* (2006.01)
*H04M 15/06* (2006.01)
*H04M 3/42* (2006.01)
*H04M 3/54* (2006.01)

(52) U.S. Cl.
CPC ............ *H04M 3/42042* (2013.01); *H04M 3/54* (2013.01)

(58) Field of Classification Search
CPC ..... H04M 15/00; H04M 15/09; H04M 15/48; H04M 17/00
USPC ............... 379/142.01, 142.06, 142.1, 142.15; 455/415
See application file for complete search history.

(56) References Cited

U.S. PATENT DOCUMENTS

| | | | |
|---|---|---|---|
| 5,008,930 A * | 4/1991 | Gawrys | H04M 3/5183 379/142.01 |
| 6,222,913 B1 * | 4/2001 | Cho | H04M 3/42314 379/142.04 |
| 6,826,271 B1 * | 11/2004 | Kanabar | H04M 3/42042 379/142.01 |
| 6,996,219 B2 | 2/2006 | Rodriguez et al. | |
| 7,260,198 B1 * | 8/2007 | Scott | H04M 3/42221 379/142.06 |
| 2002/0076022 A1 * | 6/2002 | Bedingfield | H04M 3/4228 379/142.01 |
| 2007/0153999 A1 * | 7/2007 | Daigle | H04M 1/274575 379/142.07 |

* cited by examiner

*Primary Examiner* — Quoc D Tran
(74) *Attorney, Agent, or Firm* — Lathrop & Gage LLP

(57) ABSTRACT

Systems and methods for providing context to a forwarded call include a private branch exchange (PBX) that has an interface for receiving a call from a calling device. The call includes a caller ID of the calling device. The PBX stores a company ID for identifying the company and includes a signal handler for forwarding the received call as a forwarded call to a receiving device, and a caller ID enhancer for adding context to the forwarded call. The context includes the company ID and a selection made by a user of the calling device. The receiving device displays the context prior to answering the forwarded call.

8 Claims, 6 Drawing Sheets

SYSTEMS AND METHODS FOR PROVIDING CONTEXT TO A FORWARDED CALL

BACKGROUND

FIG. 1 shows a prior art call forwarding scenario 100 where a caller "A" calls company "B", and is forwarded by a private branch exchange (PBX) 102 associated with company "B" to a call recipient "C". Call recipient "C" receives caller ID information 104 indicating that caller "a" has initiated the call. However, call recipient "C" is not aware that the call has been forwarded from PBX 102 of company "B".

SUMMARY OF THE INVENTION

In one embodiment, a method for providing context to a forwarded call includes the steps of: receiving, within a private branch exchange (PBX) of a company, an incoming call from a calling device, the incoming call including a caller ID of the calling device; forwarding the incoming call to a receiving device; and adding context information to at least one field of a protocol of the forwarded call. The receiving device receives the context information prior to answering the forwarded call.

In another embodiment, a method provides context to a forwarded call. A PBX of a company receives an incoming call from a calling device, the incoming call including a caller ID of the calling device. The incoming call is forwarded to a receiving device. A USSD message containing a context of the forwarded call is generated and sent to the receiving device prior to a second ring of the forwarded call. The receiving device receives the context for the forwarded call.

In another embodiment, a system for providing context to a forwarded call includes a PBX associated with a company. The PBX includes an interface for receiving a call from a calling device, where the call includes a caller ID of the calling device. The interface determines an indication representing a selection made by a user of the calling device. The PBX includes a company ID for identifying the company, a signal handler for forwarding the received call as a forwarded call to a receiving device, and a caller ID enhancer for adding context to the forwarded call such that the receiving device displays the context of the forwarded call prior to answering the forwarded call. The context includes the caller ID and the indication.

DETAILED DESCRIPTION OF THE EMBODIMENTS

Figure 1:
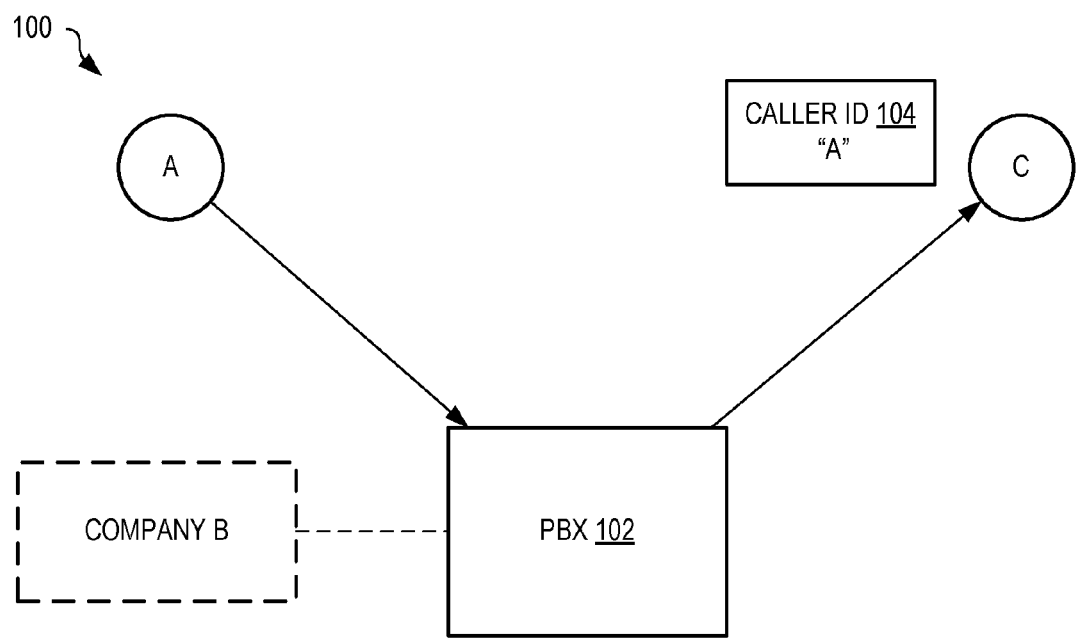
FIG. 1 shows a prior art call forwarding scenario.
Figure 2:
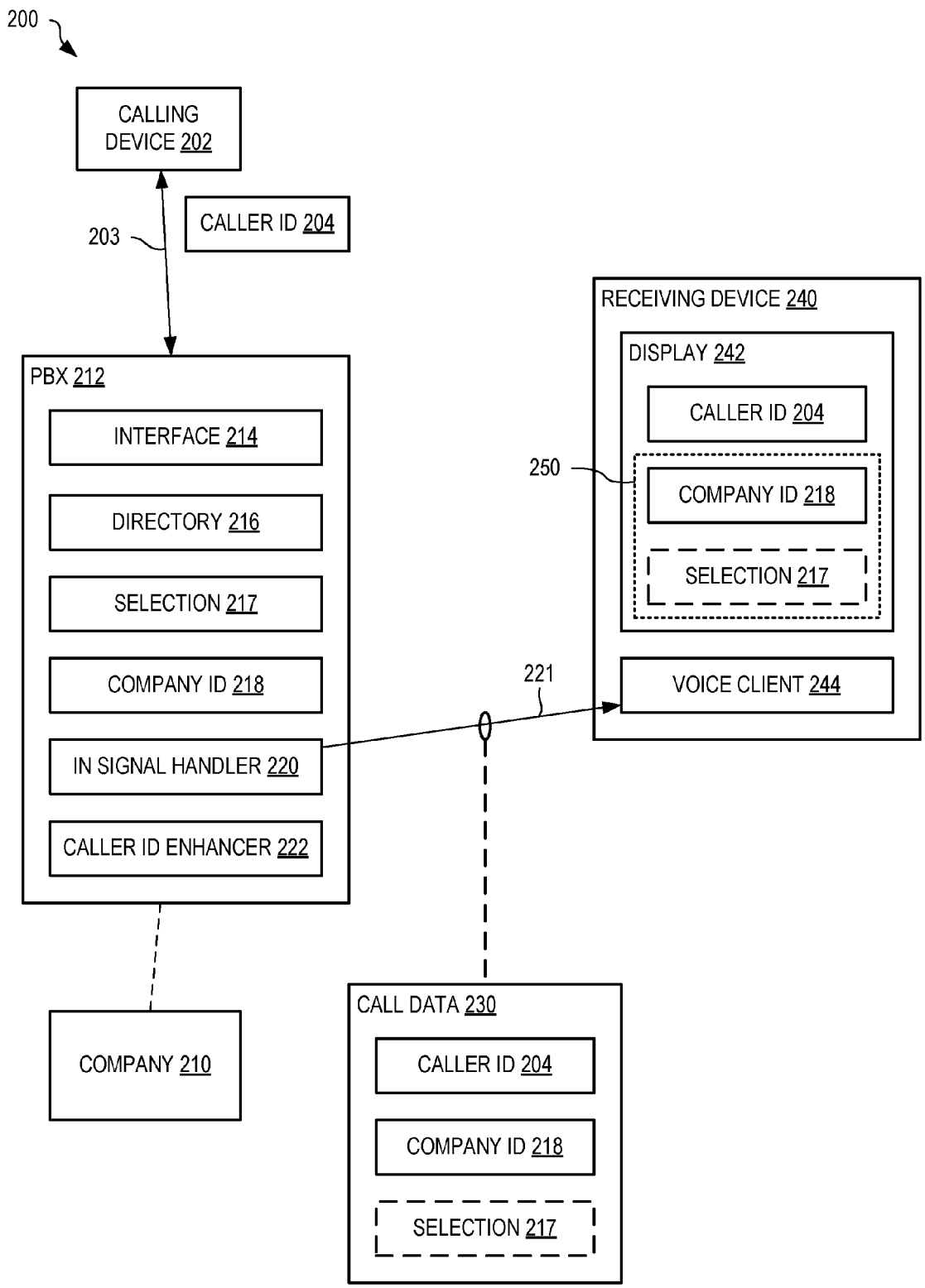
FIG. 2 shows one exemplary system for providing context to a forwarded call, in an embodiment.
Figure 3:
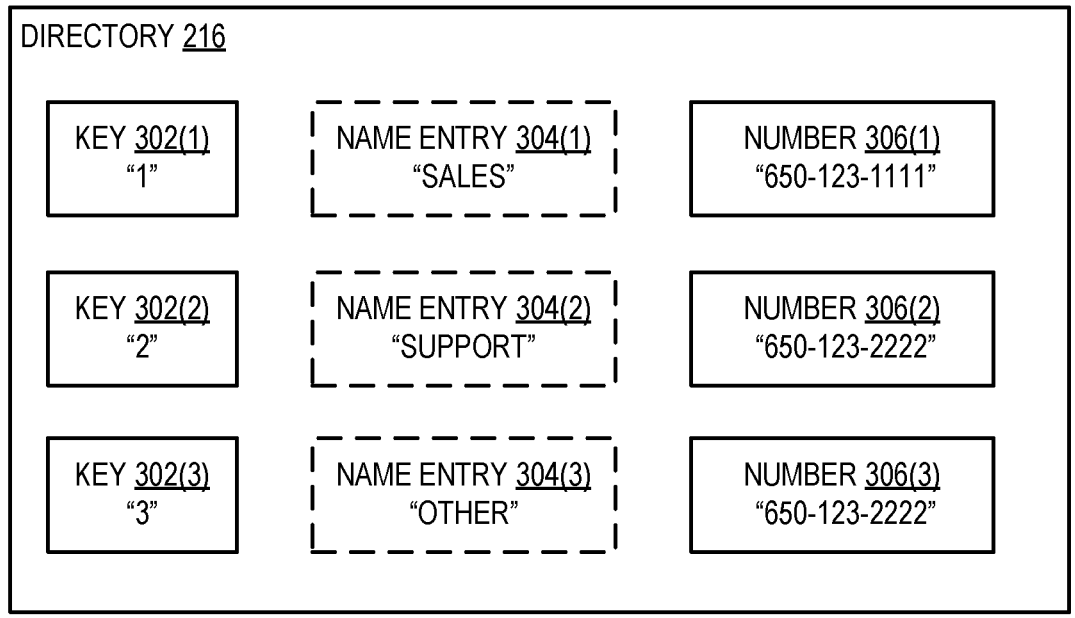
FIG. 3 shows the directory of FIG. 2 in further exemplary detail.
Figure 4:
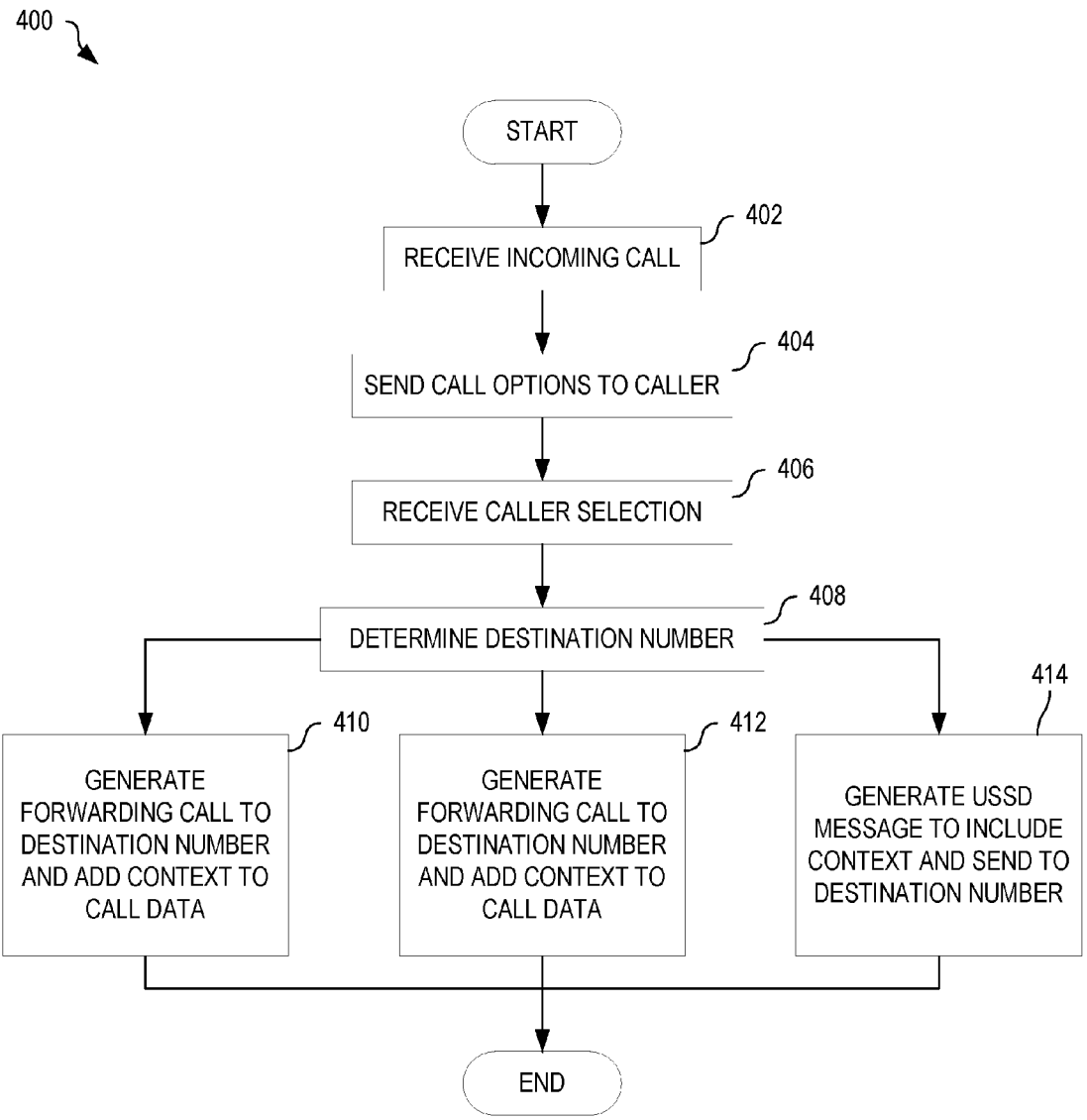
FIG. 4 is a flowchart illustrating one exemplary method for providing context to a forwarded call, in an embodiment.

FIG. 2 shows one exemplary system 200 for providing context to a forwarded call, in an embodiment. A company 210 utilizes a private branch exchange (PBX) 212 to receive calls. PBX 212 may be located at or proximate company 210, but may be hosted elsewhere, such as in the cloud, at a carrier neutral data center, or at a carrier data center. PBX 212 includes an interface 214 and a directory 216. FIG. 3 shows directory 216 of FIG. 2 in further exemplary detail. FIG. 4 is a flowchart illustrating one exemplary method 400 for providing context to a forwarded call. Method 400 is for example implemented within PBX 212. FIGS. 2, 3, and 4 are best viewed together with the following description.

In one example of operation, as shown in step 402 of method 400, interface 214 answers a call from a calling device 202. As shown in step 402, interface 214 then audibly presents menu options from directory 216 to the user of calling device 202. For example, based upon directory 216, interface 214 may say "Press one for sales, press two for support, or press three for all other enquiries." In step 406 of method 400, interface 214 receives a selection 217 from the user of calling device 202. In step 408, interface 214 determines a destination phone number (e.g., an external phone number corresponding to the selected entry within directory 216). For example, if the user of calling device 202 presses the "2" button to request to speak with someone from the support department of company 210, interface 214 retrieves number 306(2) "650-123-2222" from the second entry of directory 216. Interface 214 then triggers IN signal handler 220 of PBX 212 to forward incoming call 203 to receiving device 240 as forwarded call 221. In step 410 of method 400, IN signal handler 220 generates call data 230 for forwarded call 221 with caller ID 204 of calling device 202, a caller ID enhancer 222 adds company ID 218 of company 210 to one or more fields of call data 230, and the caller ID enhancer 222 optionally also adds selection 217 to one or more fields of call data 230. Company ID 218 may represent one or both of a telephone number of company 210, and a name of company 210. Call data 230 represents at least part of the IN signaling protocol of forwarded call 221.

Thus, upon receiving forwarded call 221, a voice client 244 of receiving device 240 may display caller ID 204, company ID 218, and optionally selection 217, on display 242 of receiving device 240 such that a user of receiving device 240 may fully understand the context of the incoming call prior to answering. That is, the information provided within company ID 218 and selection 217 forms additional context 250 for forwarded call 221.

For clarity of illustration, these examples do not show the switches used to handle calls 203, 211. As appreciated by one skilled in the art, calling device 202 may initiate call 203 via a first switch, and PBX 212 may initiate forwarded call 221 via the first switch, or via a second switch.

Figure 5:
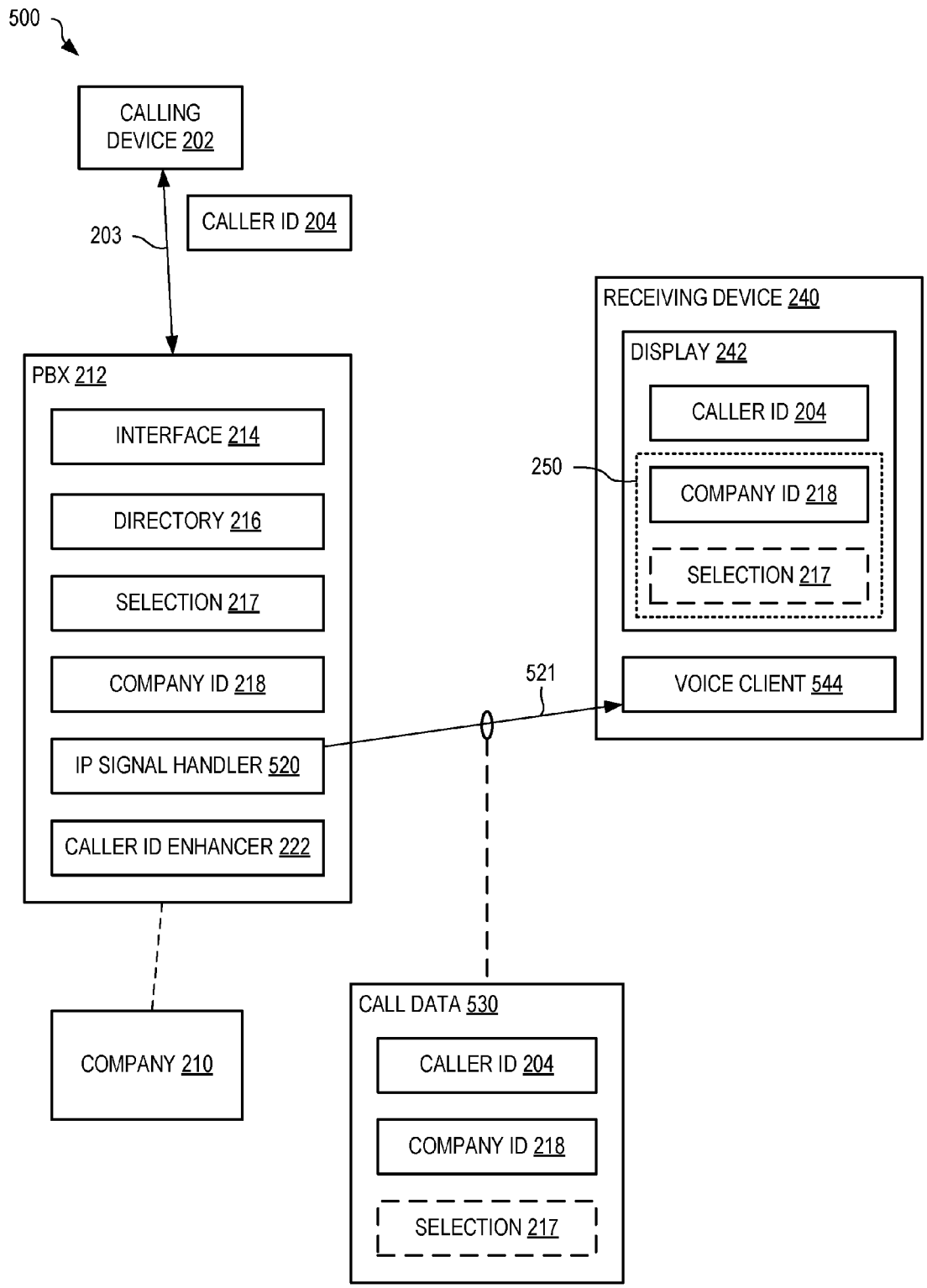
FIG. 5 shows one exemplary system for providing context to a forwarded call, in an embodiment.

FIG. 5 shows one exemplary system 500 for providing context to a forwarded call, in an embodiment. System 500 is similar to system 200 of FIG. 2, but is configured to handle IP protocol calls. PBX 212 is configured with an IP signal handler 520 that operates to forward incoming call 203 to a voice client 544 of receiving device 240 as forwarded call 521. In step 412 of method 400, IP signal handler 520 generates call data 530 for forwarded call 521 with caller ID 204 of calling device 202, and caller ID enhancer 222 adds context of company ID 218 of company 210 to one or more fields of call data 530, and caller ID enhancer 222 optionally also adds context of selection 217 to one or more fields of call data 530. Call data 530 represents at least part of the IP signaling protocol of forwarded call 521, such as for one or more of SIP, XMPP and IAX signaling. In one embodiment, voice client 544 is modified to retrieve company ID 218, and optional selection 217 from the used fields of call data 530 and to then display additional context 250 as one or both of company ID 218, and optional selection 217 on display 242.

Figure 6:
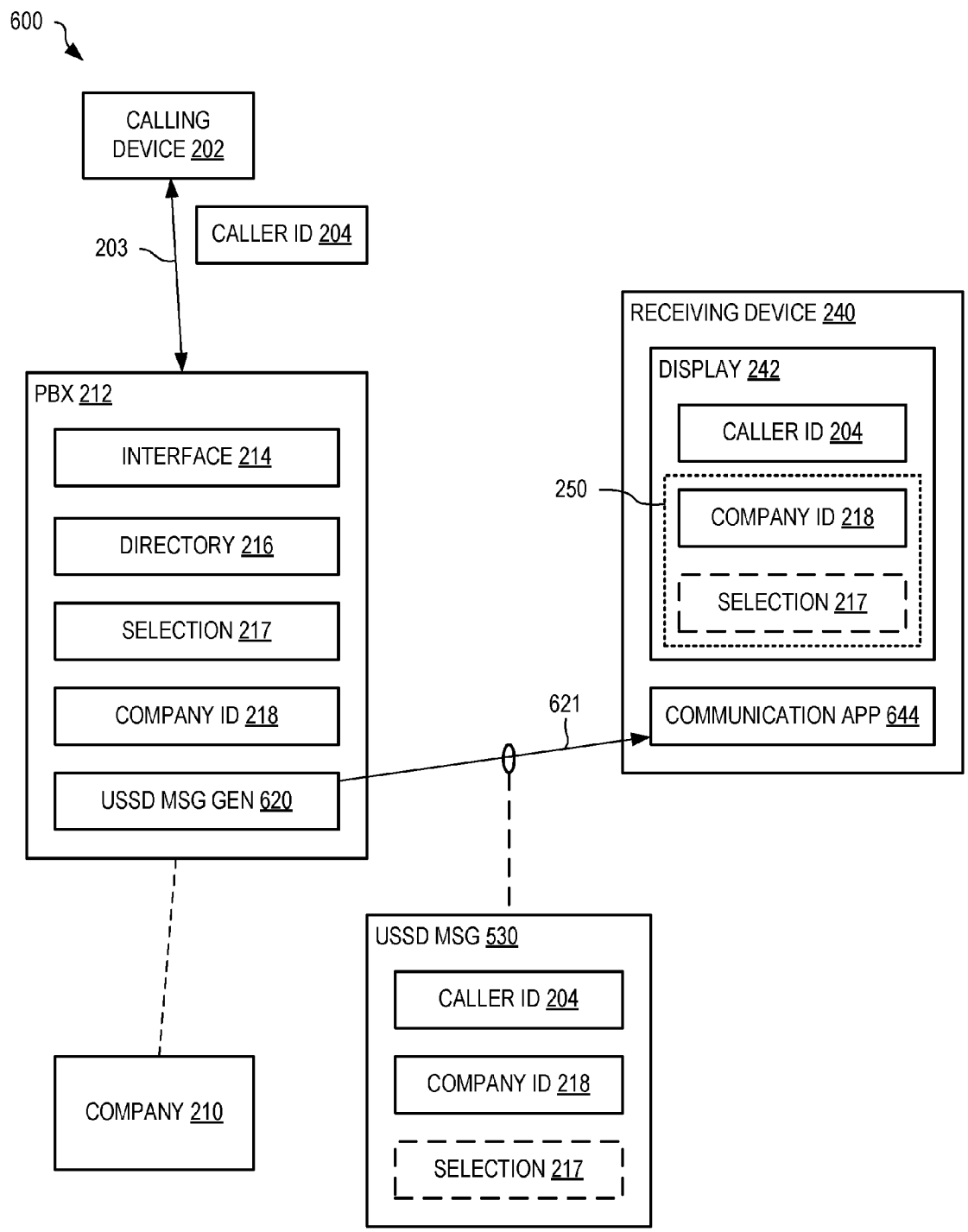
FIG. 6 shows one exemplary system for providing context to a forwarded call, in an embodiment.

FIG. 6 shows one exemplary system 600 for providing context to a forwarded call, in an embodiment. System 600 is similar to system 200 of FIG. 2, but is configured to generate and send USSD (Unstructured Supplementary Service Data) messages to communication application 644 of receiving device 240 immediately prior to initiating forwarding incoming call 203 to receiving device 240 (or prior to the second ring of forwarded incoming call 203). In step 414 of method 400, USSD message generator 620 generates, prior to forwarding incoming call 203, USSD message 630 including caller ID 204 of calling device 202, company ID 218 of company 210, and optionally selection 217.

In one embodiment, PBX 212 includes two or more of IN signal handler 220, IP signal handler 520, and USSD message generator 620. Thus, PBX 212 may invoke optimal call handling based upon one or both of incoming call 203 and receiving device 240. For example, directory 216 may define a configuration of each receiving device 240 in association with number 306, such that forwarded call 221, 521 and USSD message 621 is automatically used.

In one embodiment, voice client 544 and/or communication application 644 is configured to change a color attribute (e.g., a skin, a background color, and/or a font color) of display 242 based upon one or both of received company ID 218 and selection 217 to provide additional context 250. Thus, the user of receiving device 240 is clearly informed of the company associated with the incoming call and context thereof.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for providing context to a forwarded call, comprising:
    receiving, within a private branch exchange (PBX) of a company, an incoming call from a calling device, the incoming call including a caller ID of the calling device;
    forwarding the incoming call to a receiving device external to the company, a protocol of the forwarded call including the caller ID; and
    adding context information to at least one field of the protocol of the forwarded call, the context information including a company ID of the company and the caller ID of the calling device;
    wherein the receiving device receives the context information prior to answering the forwarded call.

2. The method of claim 1, further comprising adding an indication to at least one field of the protocol, the indication representing a selection made by a user of the calling device in response to audibly presented menu options when interacting with the PBX.

3. The method of claim 1, wherein the company ID is a name of the company.

4. The method of claim 1, further comprising displaying, within the receiving device prior to the forwarded call being answered, the context information.

5. A method for providing context to a forwarded call, comprising:
    receiving, within a private branch exchange (PBX) of a company, an incoming call from a calling device, the incoming call including a caller ID of the calling device;
    forwarding the incoming call to a receiving device external to the company;
    generating an Unstructured Supplementary Service Data (USSD) message containing a context of the forwarded call, the context including the caller ID and a company ID associated with the company;
    sending the USSD message to the receiving device prior to a second ring of the forwarded call;
    wherein the receiving device receives the context for the forwarded call.

6. The method of claim 5, the context further comprising an indication representing a selection made by a user of the calling device in response to audibly presented menu options when interacting with the PBX.

7. The method of claim 5, further comprising displaying the context within the receiving device prior to the forwarded call being answered.

8. A system for providing context to a forwarded call, comprising:
    a PBX within a company, the PBX comprising:
        an interface for receiving a call from a calling device, the call comprising a caller ID of the calling device, and the interface determining an indication representing a selection made by a user of the calling device;
        a company ID for identifying the company;
        a signal handler for forwarding the received call as a forwarded call to a receiving device external to the company; and
        a caller ID enhancer for adding context to the forwarded call such that the receiving device displays the context of the forwarded call prior to answering the forwarded call;
    wherein the context comprises the caller ID, the company ID, and the indication.

* * * * *